US007493821B2

(12) United States Patent
Wang

(10) Patent No.: US 7,493,821 B2
(45) Date of Patent: Feb. 24, 2009

(54) MICROMACHINED ACOUSTIC TRANSDUCER AND METHOD OF OPERATING THE SAME

(76) Inventor: Yunlong Wang, 47667 Gridley Ct., Fremont, CA (US) 94539

( * ) Notice: Subject to any disclaimer, the term of this patent is extended or adjusted under 35 U.S.C. 154(b) by 0 days.

(21) Appl. No.: 10/907,824

(22) Filed: Apr. 16, 2005

(65) Prior Publication Data

US 2006/0230835 A1 Oct. 19, 2006

(51) Int. Cl.
*G01L 9/12* (2006.01)

(52) U.S. Cl. .......................... 73/718; 73/724; 361/283.2

(58) Field of Classification Search ................... 73/718, 73/724; 361/283.1, 283.2, 283.3, 283.4
See application file for complete search history.

(56) References Cited

U.S. PATENT DOCUMENTS 5,619,476 A 4/1997 Haller et al.
5,870,351 A 2/1999 Ladabaum et al.
5,894,452 A 4/1999 Ladabaum et al.
6,443,901 B1 * 9/2002 Fraser ........................ 600/459
6,493,288 B2 12/2002 Khuri-Yakub et al.
6,521,181 B1 * 2/2003 Northrup et al. .............. 422/52
6,552,469 B1 4/2003 Pederson et al.
6,945,115 B1 * 9/2005 Wang .......................... 73/718

* cited by examiner

*Primary Examiner*—Andre J Allen

(57) ABSTRACT

This invention relates generally to a micromachined acoustic transducer that has a scalable array of sealed cavities and perforated members forming capacitive cells that convert the electrical signal to acoustic signal or vice versa. It also relates to the method and more particularly to a micromachined acoustic transducer which includes a plurality of micromachined membranes and perforated members forming capacitive cells and more particularly to an acoustic transducer in which the capacitive cells are connected in a scalable array whereby electrical signals are applied to the said array and converted to acoustic signals. The transducer can either be used as an acoustic actuator or a microphone.

16 Claims, 8 Drawing Sheets

MICROMACHINED ACOUSTIC TRANSDUCER AND METHOD OF OPERATING THE SAME

CROSS REFERENCE TO RELATED APPLICATION

U.S. Pat. Nos. 5,619,476; 5,870,351; 5,894,452; 6,493,288, and 6,552,469.

BACKGROUND OF THE INVENTION

Capacitive micromachined acoustic transducers have become more and more popular in today's sensor world. The efforts, however, have been mainly focused on the making of micromachined acoustic transducers to sense the passing acoustic signal. In other words, they are mainly used as microphones. There are also some efforts to develop the micromachined ultrasonic transducers which operate in the MHz or even higher frequency ranges. For example, U.S. Pat. Nos. 5,619,476; 5,870,351; 5,894,452, and 6,493,288 incorporated herein by reference, describe the fabrication of capacitive-type ultrasonic transducers in which membranes are supported above a substrate by insulative supports such as silicon nitride, silicon oxide and polyamide. The supports engage the edges of each membrane. A voltage applied between the substrate and a conductive film on the surface of the membrane causes the membrane to vibrate and emit sound waves.

Referring to FIG. 1, traditional micromachined capacitive ultrasonic transducers are made up of multiple small sealed, evacuated cells, each including a membrane 1 coated with a metal electrode 2. The membrane 1 is supported at its edges spaced from conductive base 3 by an insulating support 4. The interior volume 5 is evacuated. The geometry and the material of the membrane, and the surrounding medium determine the mechanical response of the transducer. The CMUT cells are interconnected with metal connector 6, as shown in FIG. 2.

The CMUT transducer described in U.S. Pat. No. 6,493,288 is mainly focused on the ability to sense the acoustic pressure variations as a microphone. Devices described in U.S. Pat. Nos. 5,619,476; 5,870,351 and 5,894,452 do provide the ability of a transducer that converts electrical signal to acoustic signal, the frequency of such transducer will have to be in the ultrasonic ranges that are above 1 MHz which is not suitable for general purpose audio applications.

Capacitive acoustic actuators usually provide better frequency response than traditional magnetically driven or piezoelectric actuators. For acoustic actuator that operates in audio frequency band, it is essential that the actuator has the ability to move the surrounding air in large volume, especially in the low frequency range. Almost all the micromachined sensors and actuators focus on their ability to work in the linear range of the operation. The limit of membrane deflection in the linear range, which is usually on the order of sub-micron, makes it difficult to generate the audible sound that is large enough for human to hear.

Many efforts in building an acoustic actuator that operates in audio range were also reported in other publications and patents. In U.S. Pat. No. 6,552,469, a solid state transducer is disclosed. The transducer comprises a micromachined electrostatic actuator formed of silicon, a support brace disposed above the actuator, and a membrane coupled to the support brace. The actuator is operatively coupled to the membrane. In theory, this transducer may be either a receiver or a microphone. The issue, however, is such a device has no obvious advantages in the manufacturing and operation compared with devices made with traditional technology.

OBJECTS AND SUMMARY OF THE INVENTION

It is an object of the present invention to provide a micromachined acoustic transducer that can be operated in a wide frequency range.

It is a further object of the present invention to provide a micromachined acoustic transducer that has a higher efficiency in converting electrical energy to acoustic energy, especially in the audio range.

It is another object of the present invention to provide an acoustic transducer that has a scalable array of vacuum-sealed back chambers.

It is a further object of the present invention to provide an acoustic transducer that has perforated member in the front chamber to allow the radiation of acoustic energy into the surrounding media.

It is another object of the present invention to provide an acoustic transducer that can sense the acoustic pressure change in a broad frequency range with a adjustable sensitivity.

The foregoing and other objects of the invention are achieved by a micromachined acoustic transducer including a scalable array of sealed, evacuated, micromachined cavities each including a membrane that supports a conductive electrode for movement therewith, whereby each membrane electrode forms a capacitor with the perforated member above the membrane. The membranes will vibrate to generate acoustic pressure under electrical input between the membrane and perforated member with or without the bias voltage applied. Vice versa, the membranes can also vibrate in response to the change of surrounding acoustic pressure. In this case, the acoustic transducer is acting as a microphone.

BRIEF DESCRIPTION OF THE DRAWINGS

The foregoing and other objects of the invention will be more clearly understood from the following description when read in conjunction with the accompanying drawings of which.

DESCRIPTION OF PREFERRED EMBODIMENT(S)

Figure 1:
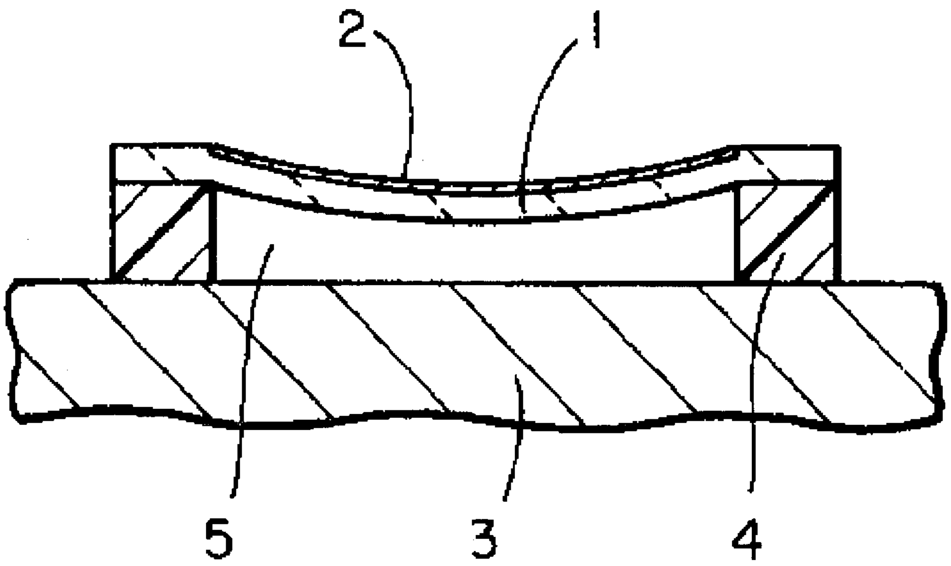
FIG. 1 is a cross-sectional view of a typical cell of a multi-cell traditional CMUT microphone.
Figure 2:
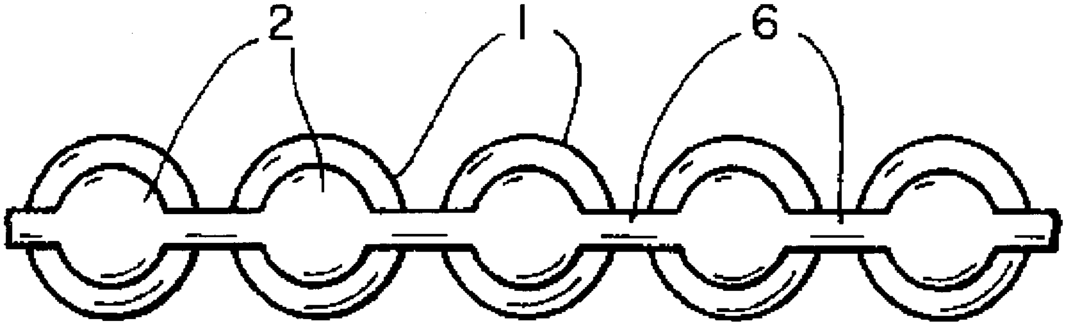
FIG. 2 is a top view of five elements of one row in a multi-row traditional CMUT microphone.
Figure 3:
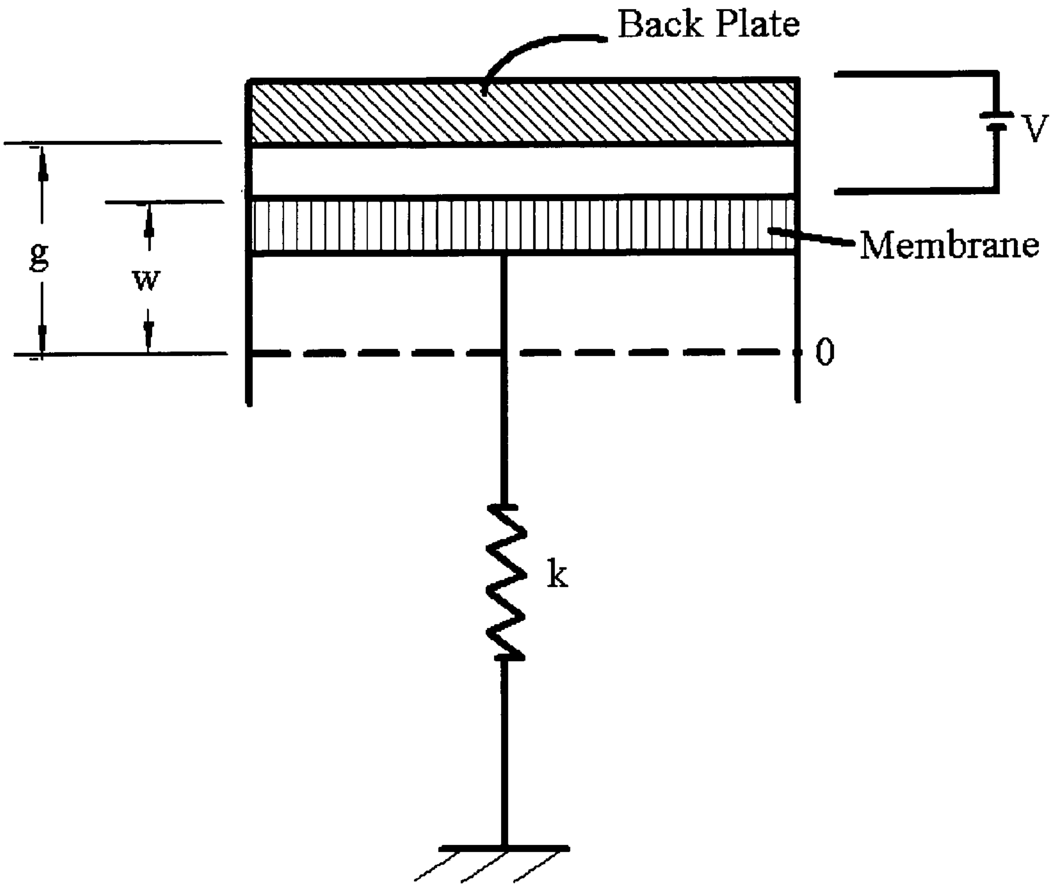
FIG. 3 is an illustration showing the schematics of a pull-in effect for a membrane and back plate structure.

The classical model used to simulate the working of electrostatic microactuator is to consider a rigid membrane attached by a spring and subjected to an electrostatic field, as shown in FIG. 3. The mechanical law governing the electrostatic actuator can be expressed as follow:

$$m\frac{d^2w}{dt^2}+\lambda\frac{dw}{dt}+kw=\frac{\varepsilon V^2}{2(g-w)^2}S \quad (1)$$

Where w is the deflection of membrane, m the mass, λ the damping factor, and k the spring constant. k depends on the geometry of the microstructure. The excitation is represented with the electrostatic pressure through a gap g applied on the membrane surface S, with V the bias voltage and $\epsilon$ the permittivity. The mass can be expressed with the geometrical characteristics of the plate: $m=\rho hS$, with ρ the volume density and h the membrane thickness. Equation (1) shows clearly the non-linearity of the electrostatic microactuator. The excitation depends on the plate deflection. There is no analytic solution for this equation. We can express the solution of the deflection in a static mode. In this case, all derivations are null. We obtain the classical voltage limitation Vs due to the instability of the electrostatic excitation; this instability provokes the sticking of the membrane on the back plate. When $$V<\sqrt{\frac{8kg^3}{27\varepsilon S}}$$

the equilibrium is stable. But when $$V>\sqrt{\frac{8kg^3}{27\varepsilon S}}$$

the equilibrium is unstable. The membrane will be stuck on to the back plate.

Figure 4:
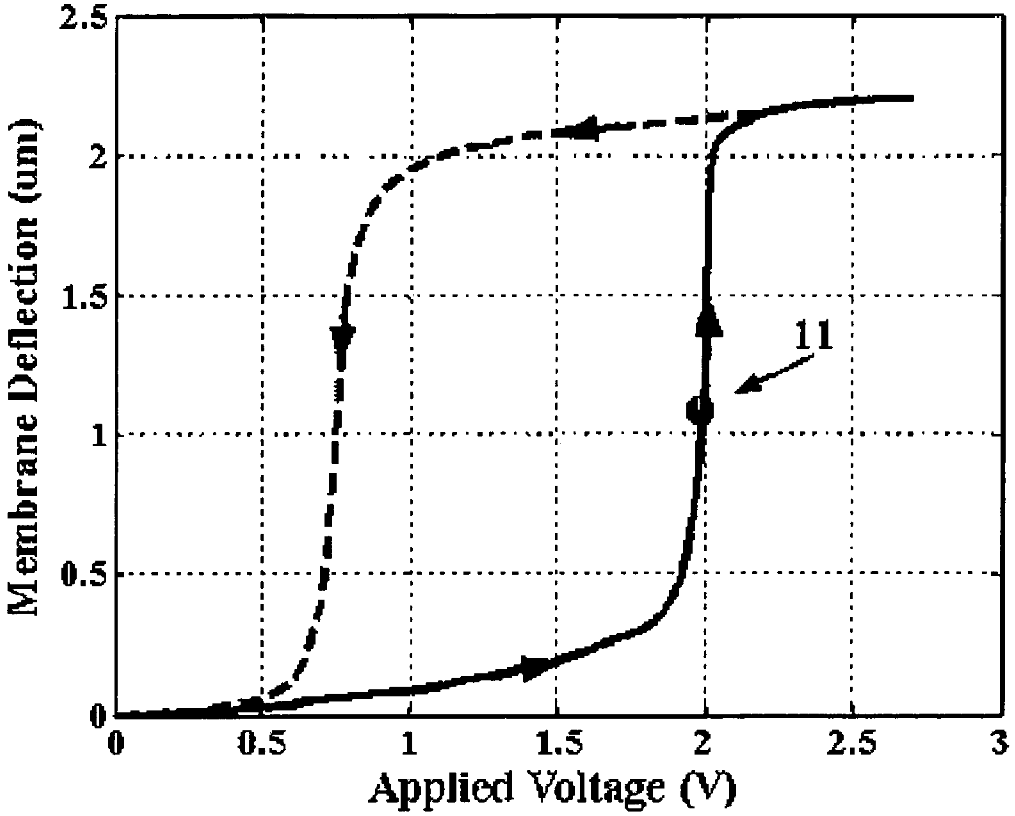
FIG. 4 illustrates the hysteresis curve due to the pull-in effect in membrane.

FIG. 4 illustrates the hysteresis effect due to the non-linearity of the electrostatic microactuator under applied bias voltage V Consider now that a pressure force is also acting on the membrane such that it is pulling the membrane away from the back plate. Equation (1) now becomes:

$$m\frac{d^2w}{dt^2}+\lambda\frac{dw}{dt}+kw=\frac{\varepsilon V^2}{2(g-w)^2}S-pS \quad (2)$$

Where, p is the pressure difference across the membrane. Clearly, p is not a function of the membrane deflection w. The snap down voltage is then calculated as:

$$V_S=\sqrt{\frac{8(kg+pS)^3}{27\varepsilon Sk^2}} \quad (3)$$

The presence of the pressure force on the membrane has essentially increased the snap down voltage. And the membrane deflection is given by:

$$w=\frac{kg-2pS}{3k} \quad (4)$$

This means with the pressure force acting on the membrane, the membrane is less deflected, and therefore, the pull-in distance is larger than that at the normal condition.

The acoustic transducer fabricated according to one preferred embodiment of this invention has a vacuum sealed cavity under the membrane. And therefore p is the same as the atmospheric pressure.

Equations (3) and (4) illustrate that microactuators with the structure fabricated according to one preferred embodiment of this invention will potentially have the advantage of larger oscillating amplitude around the equilibrium position compared with the normal situation.

Figure 5:
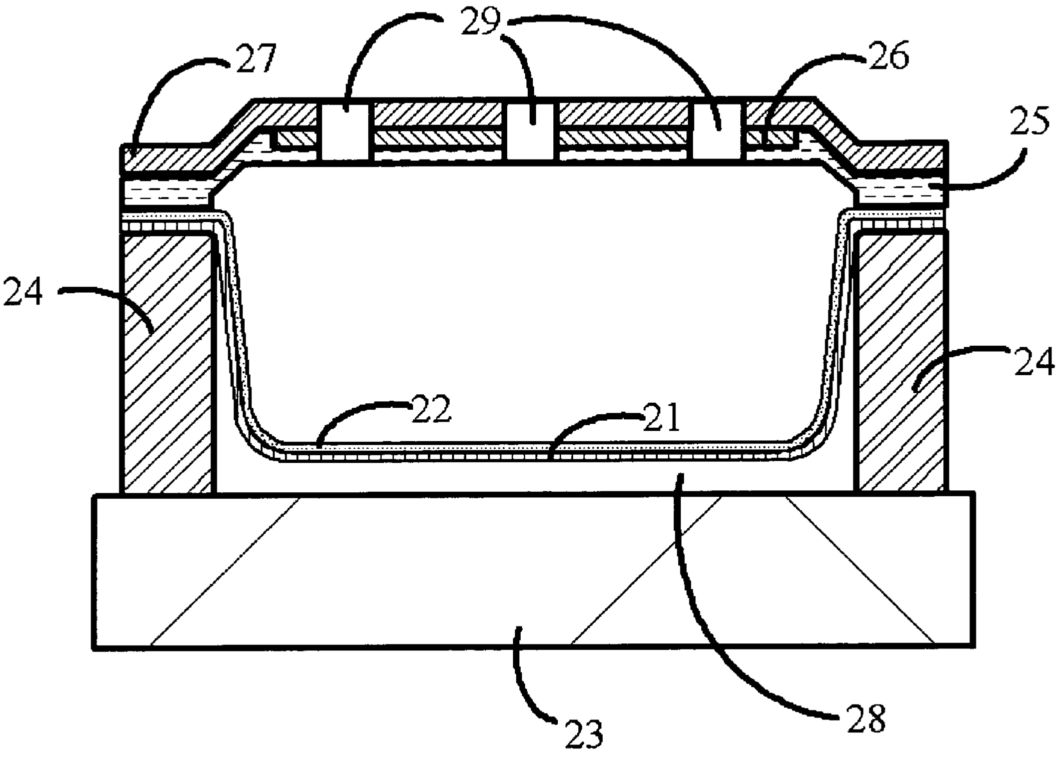
FIG. 5 is a cross-sectional view of a typical cell of transducer fabricated according to this invention.
Figure 6:
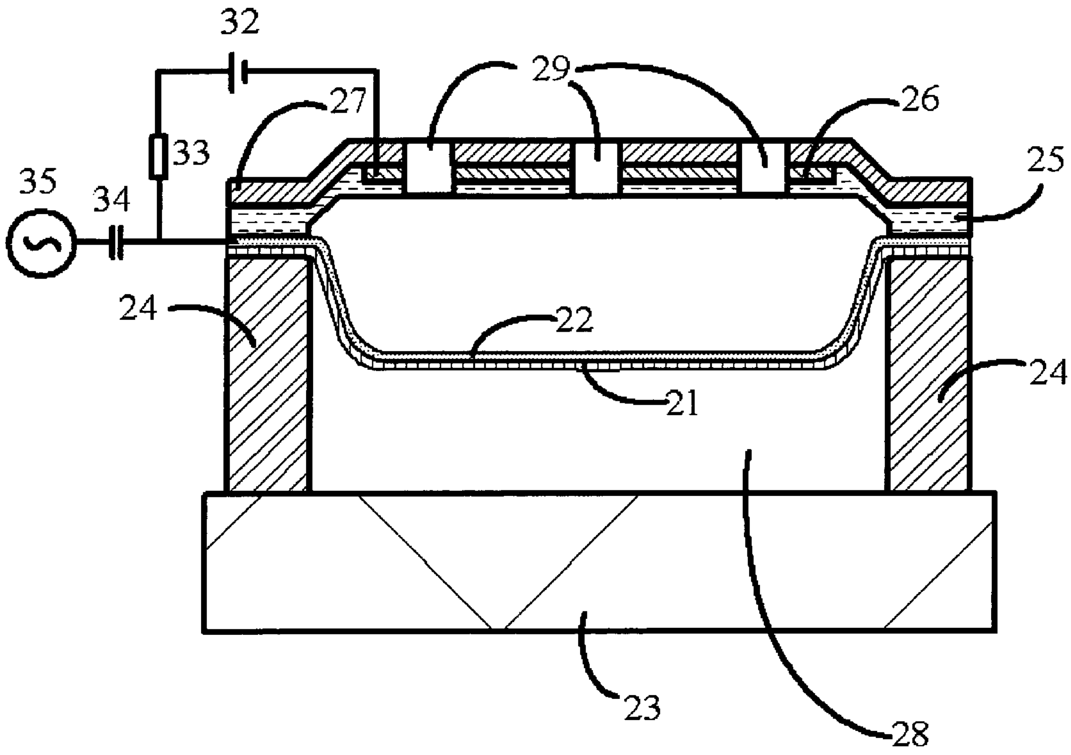
FIG. 6 is also a cross-sectional view of a typical cell of transducer fabricated according to this invention where the membrane is deflected due to applied bias voltage.

Referring now to FIG. 5. The micromachined acoustic transducer fabricated according to one embodiment of this invention is consisted of a membrane 21 supported by insulating supports 24. Metal layer 22 is coated on the membrane 21 to make electrical contact and to form one of the electrodes of a capacitor formed between metal layers 21 and 26. The order of metal electrode 22 and membrane 21 can also be reversed; meaning the metal electrode 22 may be coated at the bottom of membrane 21. The membrane 21 is supported at its edges spaced from non-conducting base 23 by insulating supports 24. The back chamber 28 is evacuated, which causes the membrane 21 to sag as shown in FIG. 5. The size of a single membrane 21 can be large or small, and many are connected in parallel. Also supported by insulating supports 24 is a perforated member 25. Metal layer 26 is formed between the perforated member 25 and another perforated cover 27. Acoustic holes 29 are drilled on the perforated member 25 and cover 29 as well as metal electrode 26 to allow the passage of acoustic signals from the surrounding media.

Using micro-machining technology, the geometry of acoustic transducer can be precisely controlled, as can the mechanical response of the membranes. The structure of vacuum sealed back chamber 28 has many important implications for transducer performance. First, the absence of air and a perforated back-plate in the transducer structure means the stiffness of the air behind the membrane is zero in vacuum. Second, since there is no pathway for the flow of air behind the membrane, the squeeze-film damping, which is usually the dominant source of noise in other transducers over most of the audio range, is eliminated. And last, the absence of frequency-dependent circuit elements of the back-chamber and pressure equalization vents in the circuit model suggests that the uniformity of the frequency response is also improved. Unlike standard unsealed acoustic sensors or actuators, the sealed structure does not have a low-frequency acoustic roll-off when used as a sensor. In fact, the membrane can respond to excitations at arbitrarily low frequencies including atmospheric pressure fluctuations. When used as a transmitter, the back chamber sealed structure also has the advantage of no backside radiation. This eliminates the unwanted noise, and will also increase the efficiency of electrical to acoustic signal conversion. The sealed structure also has an implication of a weather-proofed device.

Figure 7:
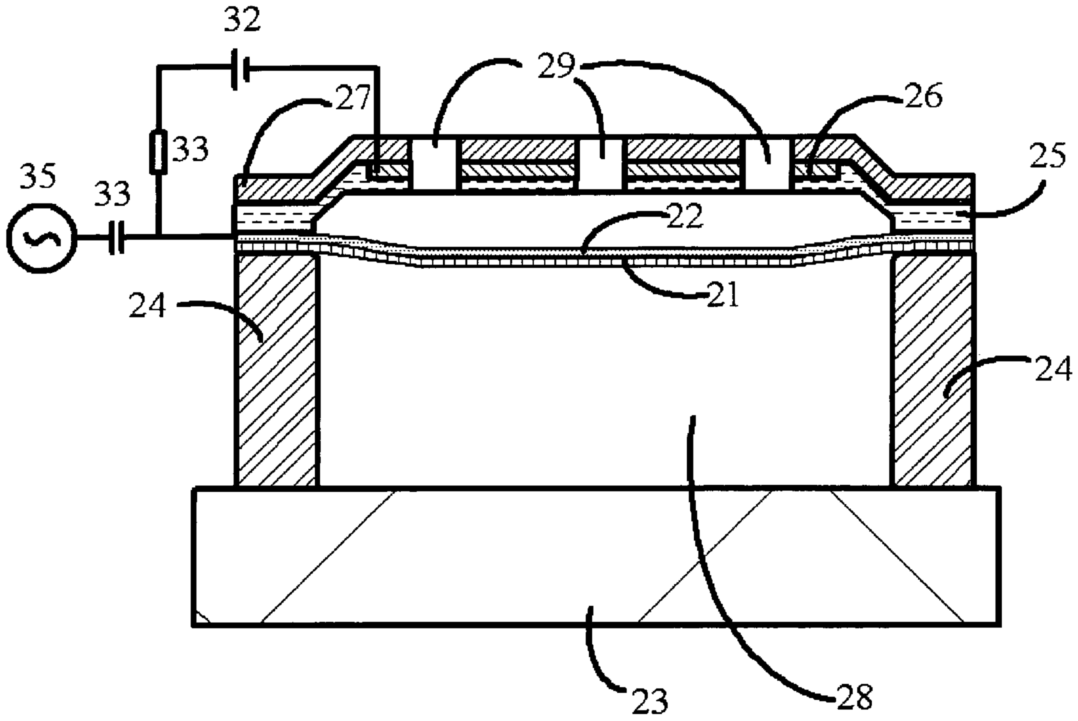
FIG. 7 shows a cross-sectional view of a typical cell of transducer fabricated according to this invention where the membrane is deflected further upward due to applied bias voltage.

When in operation, bias voltage 32 is applied across the electrodes 22 and 26. Membrane 21 will then be pulled up and located somewhere in the middle of its sagging. The driving electrical signal can be applied at 35 to drive the membrane 21 up (as shown in FIG. 7) and down (the unbiased state in FIG. 5), generating the acoustic pressures, which will be transmitted out through acoustic holes 29 on the perforated member 25 and cover 27. Resistor 33 is used for short circuit protection, and capacitor 33 is to separate the driving alternative electrical signal and the bias voltage 32.

The biasing of membrane 21 is achieved by applying the bias voltage across electrodes 22 and 26. The magnitude of the bias voltage is chosen such that the deflection of membrane 21 will be close to the mid point 11 of the hysteresis curve shown in FIG. 4. This allows the membrane 21 to have the maximum up and down deflection amplitude when driven to generate acoustic signal. In addition, this section of the hysteresis curve has the steep slope, which means that with small variation of driving electrical signal 35, the membrane 21 will exhibit large oscillation amplitudes, thereby achieving higher electrical to acoustic signal conversion efficiency.

Figure 8:
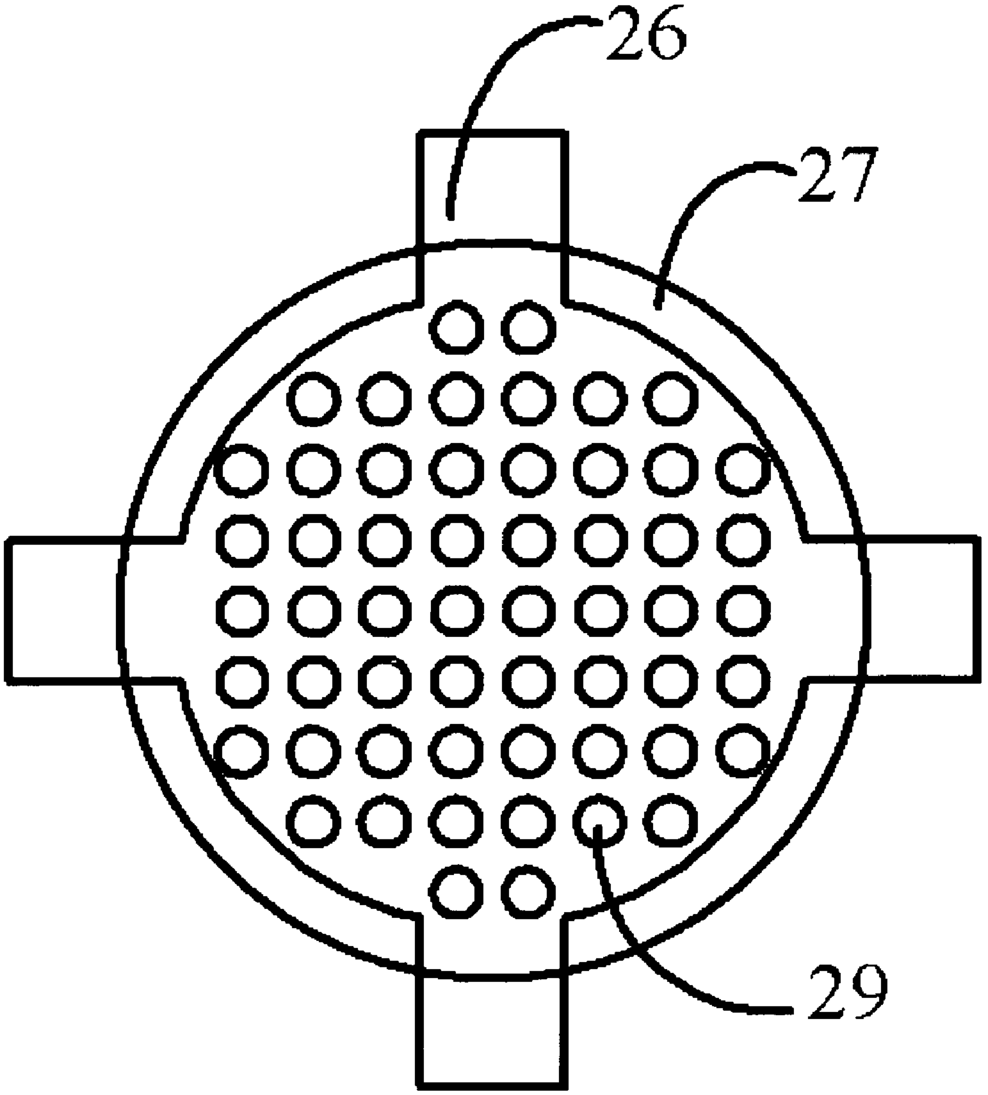
FIG. 8 shows the top view of a typical cell of transducer fabricated according to this invention.
Figure 9:
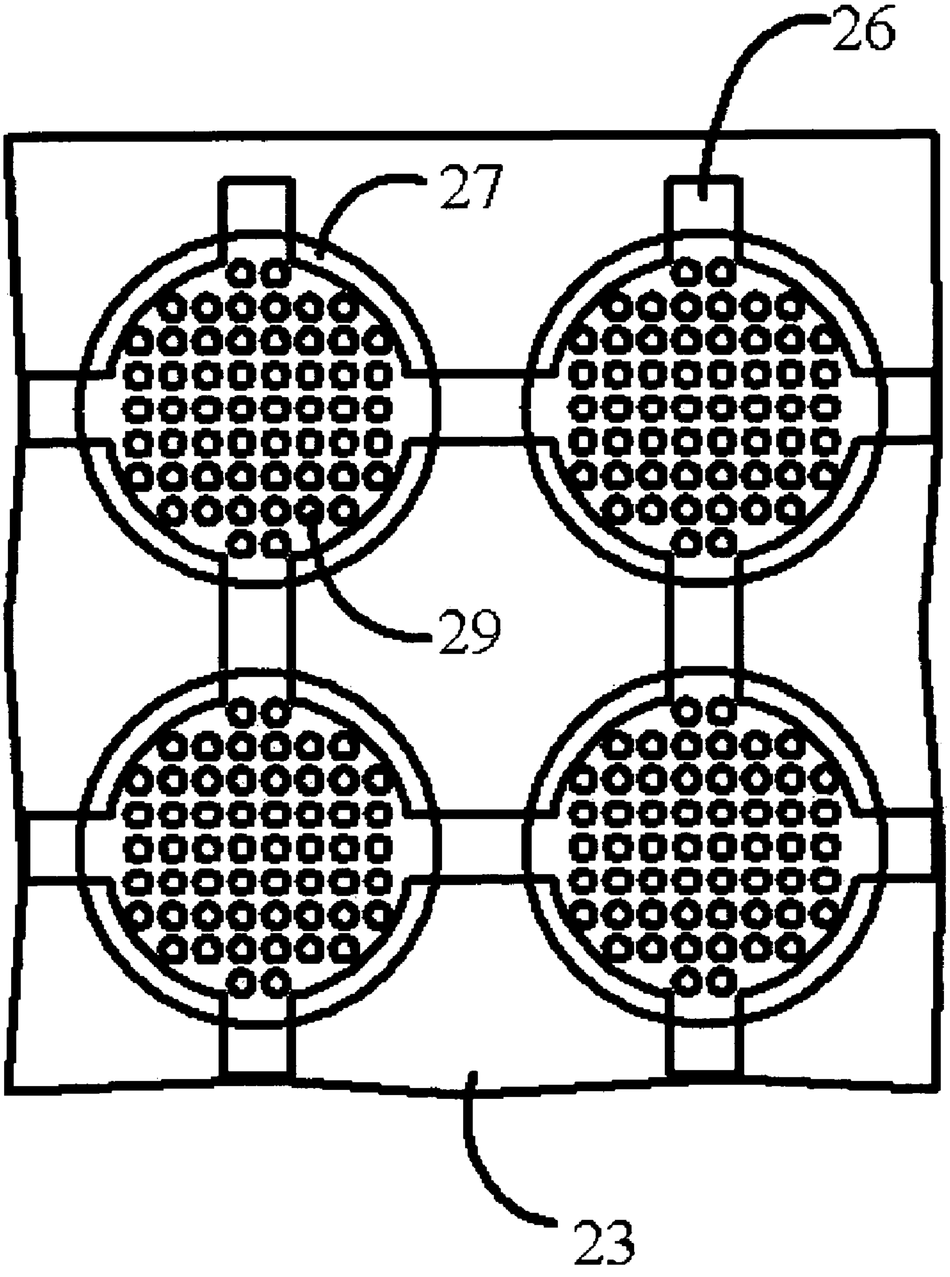
FIG. 9 schematically illustrates a scalable array of transducers fabricated according to this invention.

FIG. 8 shows the top view of the macromachined acoustic transducer fabricated according to the embodiment of this invention. A number of such transducers can be arranged to form a scalable array, as shown in FIG. 9, to achieve the desired sound pressure level and beam patterns.

When used as a microphone, its sensitivity can be adjusted by varying the applied bias voltage across the electrodes 22 and 26.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A micromachined capacitive acoustic transducer including a plurality of micromachined cells each including a membrane supporting a conductive electrode for movement therewith whereby each electrode forms with perforated members a capacitor whose capacitance varies with movement of the membrane relative to the perforated members;

a cavity region formed by said membrane and a substrate;

a front chamber formed by said membrane and said perforated member; and conductive lines interconnecting conductive electrodes of adjacent capacitors.

2. A micromachined capacitive acoustic transducer as in claim 1 in which the cells are arranged in a plurality of two-dimensional matrix.

3. A micromachined capacitive acoustic transducer as in claim 1 in which the cells have vacuum evacuated cavities formed by said membranes and the said substrate.

4. A micromachined capacitive acoustic transducer as in claim 1 in which the said membrane and the said perforated members form front chambers.

5. A micromachined capacitive acoustic transducer as in claim 1 in which said perforated members have regular perforation to allow acoustic pressure radiation from said front chambers responsive to the deflection of said membranes.

6. The method of operating a micromachined capacitive acoustic transducer of the type which includes a plurality of micromachined cells arranged in a two-dimensional matrix over a broad frequency band, said cells each comprising a membrane supported by an insulating support above a substrate with a conductive electrode on each of said membrane to form with said perforated member a capacitor, said method comprising:

connecting said cells in series with conductive connecting lines whereby said connecting lines and said capacitors form a capacitive transducer whose capacitance changes with applied electrical signal to the said capacitors;

applying a bias voltage to the said capacitors such that the deflection of said membranes is close to the mid point of the pull-in hysteresis curve;

applying an alternating electrical signal to the said capacitors; and generating the deflection of said membranes responsive to the said applied electrical signal to provide an acoustic pressure output;

means of connecting to said capacitors for generating acoustic pressure signal.

7. A micromachined capacitive acoustic transducer as in claim 6 in which the cells are arranged in a plurality of two-dimensional matrix.

8. A micromachined capacitive acoustic transducer as in claim 6 in which the cells have vacuum evacuated cavities formed by said membranes and the said substrate.

9. A micromachined capacitive acoustic transducer as in claim 6 in which the said membrane and the said perforated members form front chambers.

10. A micromachined capacitive acoustic transducer as in claim 6 in which said perforated members have regular perforation to allow acoustic pressure radiation from the said front chambers responsive to the deflection of said membrane.

11. The method of operating a micromachined capacitive acoustic transducer of the type which includes a plurality of micromachined cells arranged in a two-dimensional matrix over a broad frequency band, said cells each comprising a membrane supported by an insulating support above a substrate with a conductive electrode on each of said membrane to form with said perforated member a capacitor, said method comprising:

connecting said cells and said perforated members in series with conductive connecting lines;

applying a bias voltage to said capacitors;

determining the change in capacitance of said cells in responsive to a received acoustic pressure signal to provide an output signal representative of the acoustic pressure signal; and means of connecting to said capacitors for generating electrical signal.

12. A micromachined capacitive acoustic transducer as in claim 11 in which the cells are arranged in a plurality of two-dimensional matrix.

13. A micromachined capacitive acoustic transducer as in claim 11 in which the cells have vacuum evacuated cavities formed by said membranes and the said substrate.

14. A micromachined capacitive acoustic transducer as in claim 11 in which the said membrane and the said perforated members form front chambers.

15. A micromachined capacitive acoustic transducer as in claim 11 in which said perforated members have regular perforation to allow the passage of acoustic pressure impinging on said membrane.

16. A micromachined capacitive acoustic transducer as in claim 1 or 6 or 11 in which the membranes and perforated members are circular or rectangular or square.

* * * * *